US011341799B2

(12) United States Patent
Feuerwerger

(10) Patent No.: US 11,341,799 B2
(45) Date of Patent: May 24, 2022

(54) CONSTRUCTION SITES ACCESS CONTROL SYSTEM AND ASSOCIATED ID CARDS

(71) Applicant: AssureTech LLC, Brooklyn, NY (US)

(72) Inventor: Isaac Feuerwerger, Brooklyn, NY (US)

(73) Assignee: ASSURETECH LLC, Brooklyn, NY (US)

( * ) Notice: Subject to any disclaimer, the term of this patent is extended or adjusted under 35 U.S.C. 154(b) by 46 days.

(21) Appl. No.: 17/073,384

(22) Filed: Oct. 18, 2020

(65) Prior Publication Data

US 2021/0150839 A1    May 20, 2021

Related U.S. Application Data

(60) Provisional application No. 62/935,181, filed on Nov. 14, 2019.

(51) Int. Cl.
*G07C 9/29* (2020.01)
*G07C 9/22* (2020.01)
*G06K 7/10* (2006.01)
*G06F 21/35* (2013.01)
*G06K 19/07* (2006.01)
*G07C 9/15* (2020.01)

(52) U.S. Cl.
CPC ............... *G07C 9/29* (2020.01); *G06F 21/35* (2013.01); *G06K 7/10099* (2013.01); *G06K 19/0723* (2013.01); *G07C 9/15* (2020.01); *G07C 9/22* (2020.01)

(58) Field of Classification Search
CPC ..... G07C 9/29; G07C 9/15; G07C 9/22; G07C 9/00182; G06F 21/35; G06K 7/10099
See application file for complete search history.

(56) References Cited

U.S. PATENT DOCUMENTS

| 7,298,258 B1 * | 11/2007 | Hudgens ................ G08B 21/22 340/539.13 |
| 2018/0039930 A1 * | 2/2018 | Thomas ........... G06Q 10/06315 |
| 2018/0047237 A1 * | 2/2018 | Luker ...................... G07C 9/15 |
| 2020/0410791 A1 * | 12/2020 | Blackburn ......... G06K 9/00771 |

* cited by examiner

*Primary Examiner* — Vernal U Brown
(74) *Attorney, Agent, or Firm* — Ostrolenk Faber LLP

(57) ABSTRACT

A credentials verification system for controlling compliance with required carrying of permit cards at construction work sites has an association database with stored data that correlates work permits with RFID data corresponding to RFID tags, where a respective and unique RFID tag is assigned to and irremovably attached to each work permit. A local control system at each work site includes: an RFID tag reader that reads an RFID tag wirelessly when a worker approaches within a predetermined distance of the RFID tag reader; a local processor and a software facility associated with the local processor that verify that a sensed RFID tag is authorized; and an entry controller operating under the local processor for controlling the entranceway into the work site so as to admit a worker only when the worker has been determined to carry the required work permit(s).

18 Claims, 12 Drawing Sheets

CONSTRUCTION SITES ACCESS CONTROL SYSTEM AND ASSOCIATED ID CARDS

CROSS-REFERENCE TO RELATED APPLICATION

The present non-provisional patent application claims the benefit of and priority to U.S. Provisional Patent Application No. 62/935,181, filed Nov. 14, 2019, by Isaac Feuerwerger, and entitled "CONSTRUCTION SITES ACCESS CONTROL SYSTEM AND ASSOCIATED ID CARDS," the entire contents of which are incorporated herein by reference.

BACKGROUND OF THE INVENTION

The present invention is generally directed to controlling access to restricted areas and, more particularly, to construction site entrance and exit control systems providing functionality that assures compliance with regulatory requirements. The invention is further directed to RFID tags associated with identification cards that assist in attaining and controlling the needed functionalities, including by creating and storing information that represents the association of the RFID tags with the authorization cards.

Construction sites are highly regulated by both federal and local government agencies. Federal agencies such as the Occupational Safety and Health Administration (OSHA) impose stiff penalties for violating its regulatory requirements. Federal law, including 29 U.S.C. 666 (public law 101-508), provides under that Act that civil penalties of not more than $70,000.00 for each violation, but not less than $5,000.00 for each willful violation can be imposed.

One requirement of some governmental agencies, for example New York's Department of Buildings ("DOB") is that no one be present at construction sites other than people carrying authorization cards issued by OSHA. Local governments have their own various requirements that govern who may be present at construction sites.

Construction sites are required to be surrounded by an outside wall with access to the inside of the construction site being very carefully monitored. Construction site operators have been subjected to stiff fines for not controlling with sufficient care the entrance into their constructions sites. Surprise inspections by governmental inspectors have caused construction site operators to incur thousands of dollars in fines and penalties that they would have rather not had to pay. At the same time, construction sites are very busy areas with a constant parade of various workers and specialty contractors entering and leaving the work site. This makes it very difficult for construction site operators to assure that everyone at the construction site carries with him or her required authorization cards that have been issued to them by the various governmental agencies such as the aforementioned OSHA and DOB organizations.

Some construction site operators have installed a conventional turnstile at the entranceway into their construction site and have placed next to the turnstile a fingerprint or an identification card reader that assures that only those persons whose names have been pre-entered into a computer database are allowed through the turnstile. This kind of a system is helpful, but insufficient for the purposes of the present invention that seeks to provide a system that assures not only identification of a person entering the worksite, but also verification that the entering person has on him or her all the needed government authorization cards that are required for the site, for example, an OSHA card, a DOB card, a welder's local license and the like.

The difficulty of providing automated control and assurance of this requirement is associated with the fact that cards presently issued by OSHA, the DOB and other agencies are not smart cards. Rather, they are simple paper authorization cards with not much more than a serial number that is associated in the databases of the government agencies with corresponding persons.

Another difficulty ensues from the fact that workers who are constantly coming in and out of a construction site are oftentimes required to carry on them two or more cards and the construction site operators have a great difficulty forcing people to constantly present a number of cards to a smart card reader, each time the workers enter the site.

SUMMARY OF THE INVENTION

Accordingly, it is an object of the present invention to overcome the aforementioned and other drawbacks of the prior art.

It is a further object of the invention to provide a construction site access control system that is able to verify that the necessary cards are being carried by each person on the construction site.

Another object of the present invention is to accomplish the above objectives with a portable, preferably inexpensive RFID reader (Radio Frequency Identification) that can be easily re-located from one construction site to another construction site, and reused repeatedly.

Yet another object of the present invention to impose as few requirements on construction workers entering and exiting construction sites.

The foregoing objects of the present invention are realized by the system of the present invention which preferably includes an entranceway door system that enables controlling and providing access to a construction site by reading RFID tags that are associated with different government authorization cards, wherein the RFID tags are irremovably attached to previously issued government authorization cards. An aspect of the invention includes creating and storing the association(s) between the card ID codes and the RFIDs code.

Preferably, the invention comprises a credentials verification system for controlling compliance with required carrying of permit cards at construction work sites, the system comprising: an association database with stored data that correlates a plurality of work permits with RFID data corresponding to a plurality of RFID tags, wherein a respective and unique RFID tag is assigned to each work permit; a collection of physical work permits carried by a plurality of workers, each work permit having been issued to a single worker and being configured to be carried by the single worker to work sites, each said work permit having physically adhered thereto said respective RFID tag in a substantially irremovable manner; a local control system configured to be installed at a work site, the local system including: a) an RFID tag reader configured to read an RFID tag wirelessly, when a worker carrying the work permit approaches within a predetermined distance of said RFID tag reader; b) a local processor and a software facility associated with the local processor, the software facility being configured to verify that a sensed RFID tag is authorized by comparing the RFID data of said RFID tag against corresponding data of said work permits stored in said association database; and c) an entry controller operating under the local processor for controlling an entranceway into said work site so as to admit a worker only when said worker has been determined to carry a duly authorized, required work permit.

Preferably, the RFID tag reader is configured to read more than one RFID tag carried by the single worker and to associate each sensed RFID tag with corresponding multiple work permits. The entranceway comprises one or more locked doors and including controlling a lock associated with each door to allow entry of a worker whose RFID tag associated with a corresponding work permit has been verified. The system may include a central server in communication with a plurality of said local control systems and wherein said association database is located at and controlled by said central server. The association database includes a related local association databases that contains sufficient data to allow verification of the credentials of workers who are assigned to the local work site.

Preferably, the local processor comprises a local microcontroller to perform and execute software instructions associated with functions executed by the local control system. Or, the local processor comprises a local PCB (printed circuit board) general purpose and programmable computer to perform and execute software instructions associated with functions executed by the local control system. The entranceway comprises an entrance door and a separate exit door and wherein and an antenna for the entrance door is located on the outside of the work site and another antenna for an exit door is located inside the work site. The work site may keep available unassigned RFID tags that management personnel at a work site are able to irremovably attach to a work permit presented by a person seeking to enter work site and to cause an association record to be added to said association database upon such event.

In an embodiment, the entrance door comprises a turnstile door. The turnstile door is configured to rotate bi-directionally and wherein the local control system is configured to enable rotation if a first direction to admit a worker into the work site or in an opposite direction when a worker is sensed approaching an exit side of the turnstile.

In preferred embodiments, the local control system further comprises and is configured to control one or more auxiliary devices, an auxiliary device being one or another of a camera, a display, a loud speaker, a doorbell, a barcode reader, an OCR device and an intercom, to, respectively, photograph and store images, display instructions/information to workers and visitors, enable voice messages to be heard throughout the work site, alert management that a person at the entranceway requires assistance, read barcode or QR codes printed on a work permit, and to establish an intercom connection between the entranceway and a management office at the work site. The RFID tag reader is coupled to antennas that excite a signal in the RFID tags and receive a response signal from the RFID tags that is unique to each RFID tag. The local control system also comprises one or more of a router and a modem that enables internet communication with a remote central server and/or local WI-FI communication with local mobile controllers for the local control system.

Preferably, the local control system comprises a GSM device that provides geographical location coordinates of the local processor and the local processor is configured to send the geographical coordinates to a central server. The central server is configured to be accessible by server management devices and by one or more of customers/contractors who operate the work sites, contractors that provide services at work sites, licensed workers, governmental inspectors and vendors of products and services to said customers/contractors. The RFID tags operate in an 860 to 960 MHz range and wherein RFID tag reader said is configured to read multiple RFID tag associated with plural work permits carried by a worker seeking entry to work site. The RFID tags are sized to be attachable to work permits that are normally carried in a wallet. The system may include a facility that denies entry to a specific worker who is determined to carry less than the full complement of work permits expected to be carried by the specific worker.

Other features and advantages of the present invention will become apparent from the following description of the invention which refers to the accompanying drawings.

DETAILED DESCRIPTION OF EMBODIMENTS OF THE INVENTION

Figure 1:
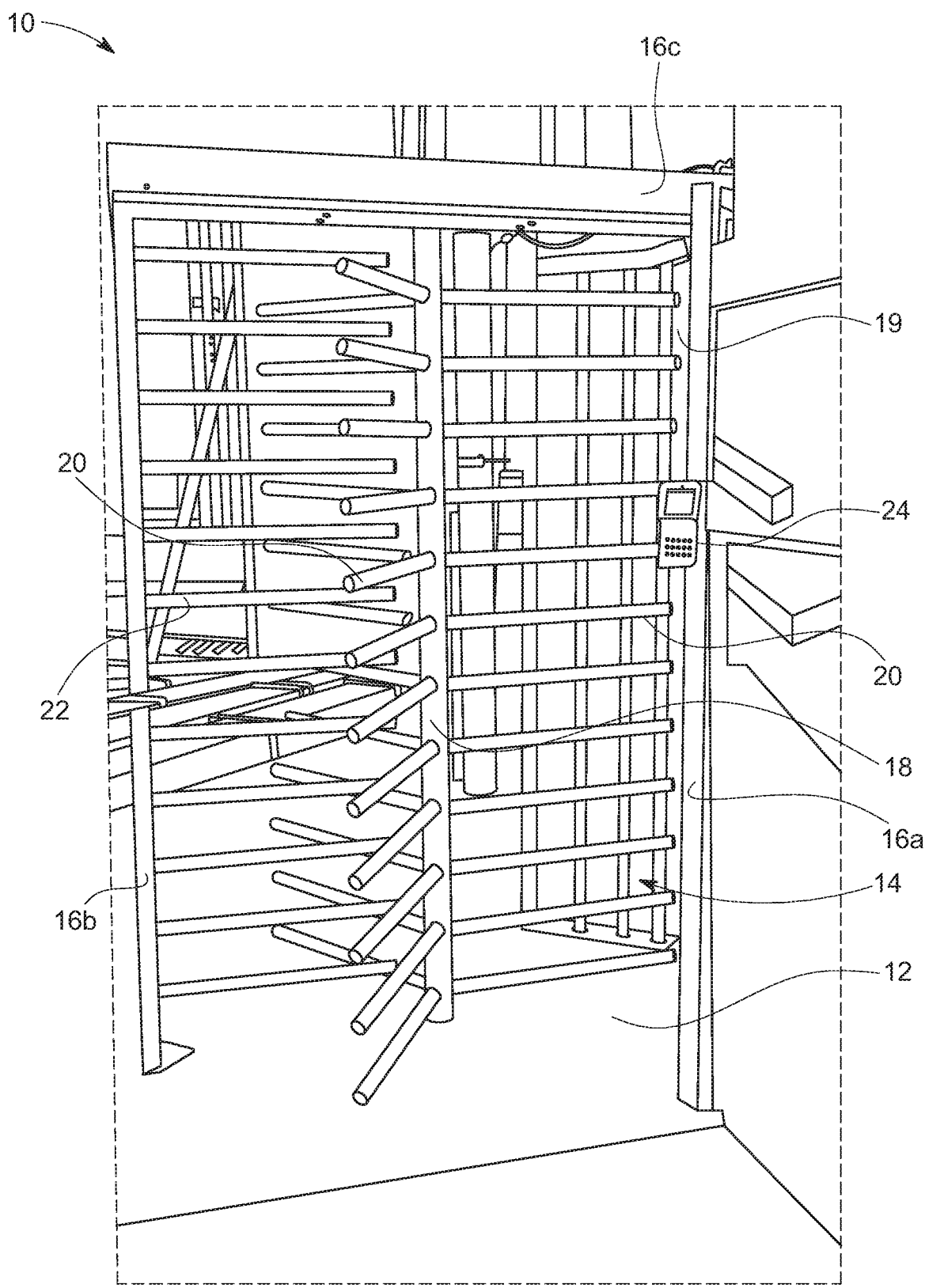
FIG. 1 is a photograph of an existing turnstile installation at a construction site.

With initial reference to the prior art, FIG. 1 is a photo of the entranceway 12 into a construction site 10 which provides a generally conventional turnstile 14. The turnstile has right and left posts 16a, 16b and a top post 16c that supports a central shaft 18 that has the familiar spokes 20 extending in different radial directions and filling the space of the door frame. The shaft 18 must rotate counterclockwise to allow entry into construction site 10 because the other direction is blocked by the bars 22 that jut into the space from the left upright post 16b.

The reader 24 is typically a fingerprint reader or an ordinary card reader that controls a mechanism (not shown) that allows the turnstile to turn by about a quarter of a turn so that only one person is admitted for each identification card presentation or fingerprint examination. This functionality is aided by the uprights 19 that constitute part of the turnstile.

Figure 2:
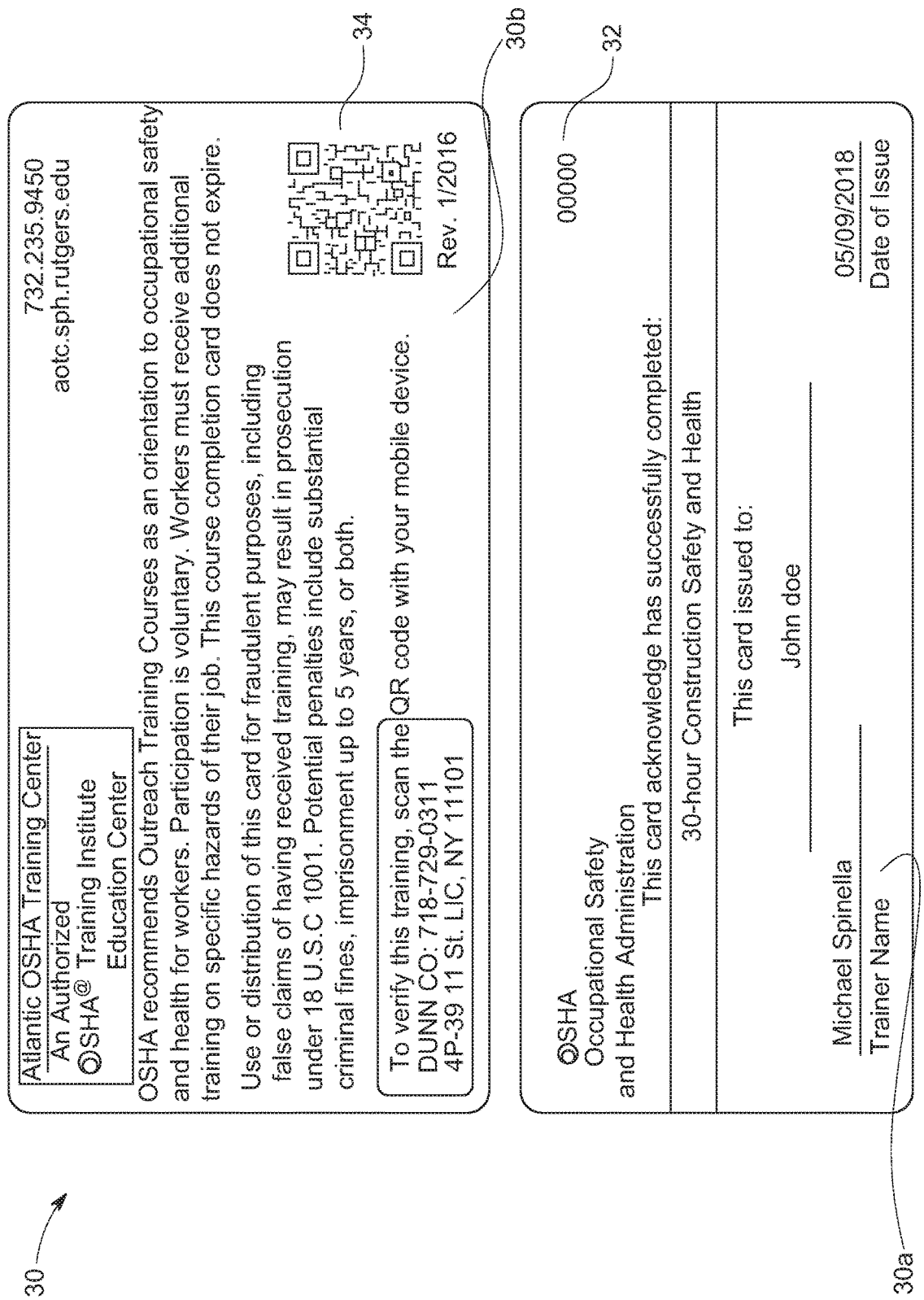
FIGS. 2 and 3 show the front and back sides of an OSHA card and a New York City Department of Building card, respectively.

Nowadays, OSHA issues authorization cards of the type shown in FIG. 2. The OSHA card 30 has one side 38 that lists the name of the bearer, the date issued and most importantly, a unique serial number 32. An opposed side of the OSHA card 30 has additional information, including a QR code 34 that provides various database information regarding OSHA.

Figure 3:
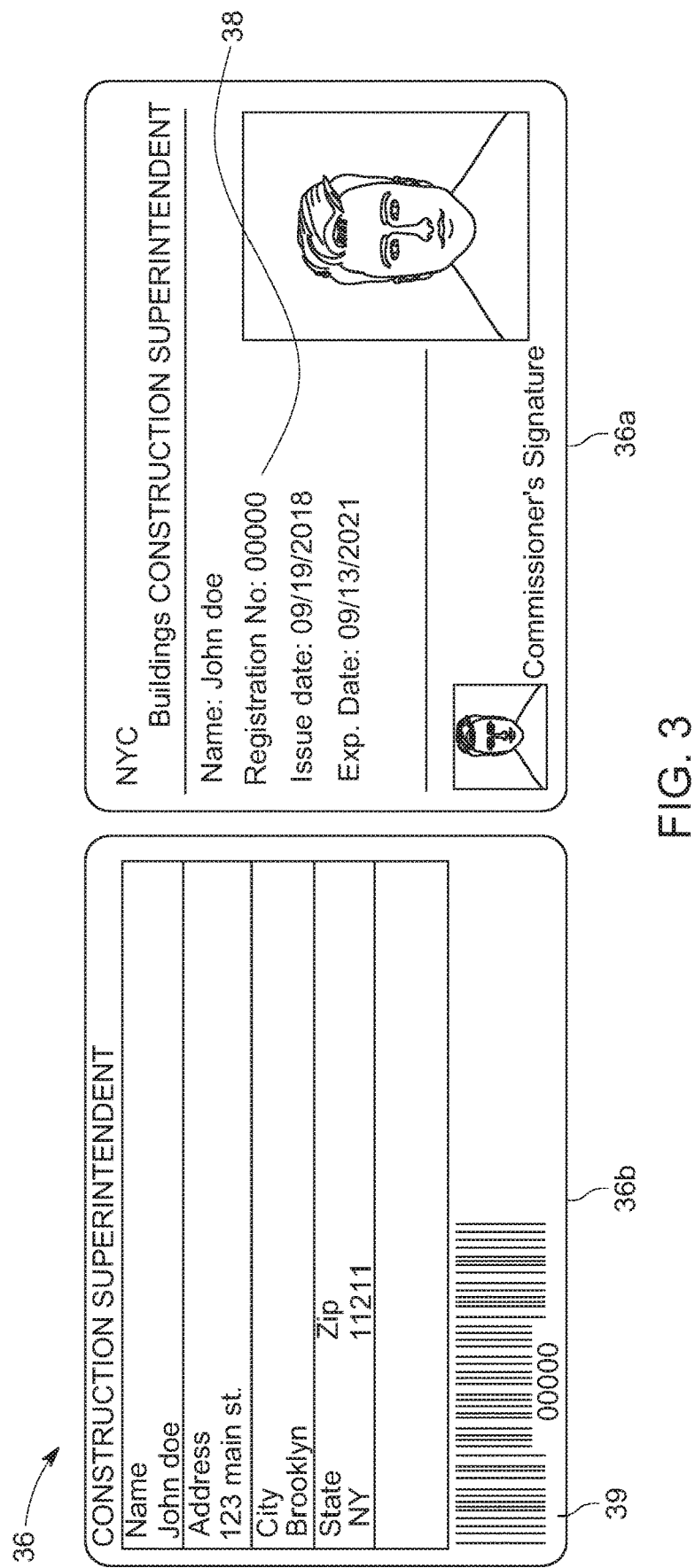

Turning to FIG. 3, a similar authorization card 36 issued by New York City's Department of Building has a front face 36a with a photograph of the bearer and other information, including the name and most importantly, the registration number 38. This information is also listed on the other side of the card that includes a bar code 39 which represents the serial number.

It is desirable in accordance with one aspect of the present invention to provide a system that allows people carrying authorization cards of the type described above to enter construction sites and to assure that they have those authorization cards on them when they enter. As previously noted, it is insufficient to have a reader that merely identifies the person entering. What is necessary for the purposes of construction sites is to assure that all the cards that are required for the site are carried with the person entering. The present invention achieves one of its objectives by providing a system that enables converting existing construction site authorization cards to more sophisticated cards that can be read by RFID readers that are widely available and very inexpensively deployed throughout industry.

Figure 4:
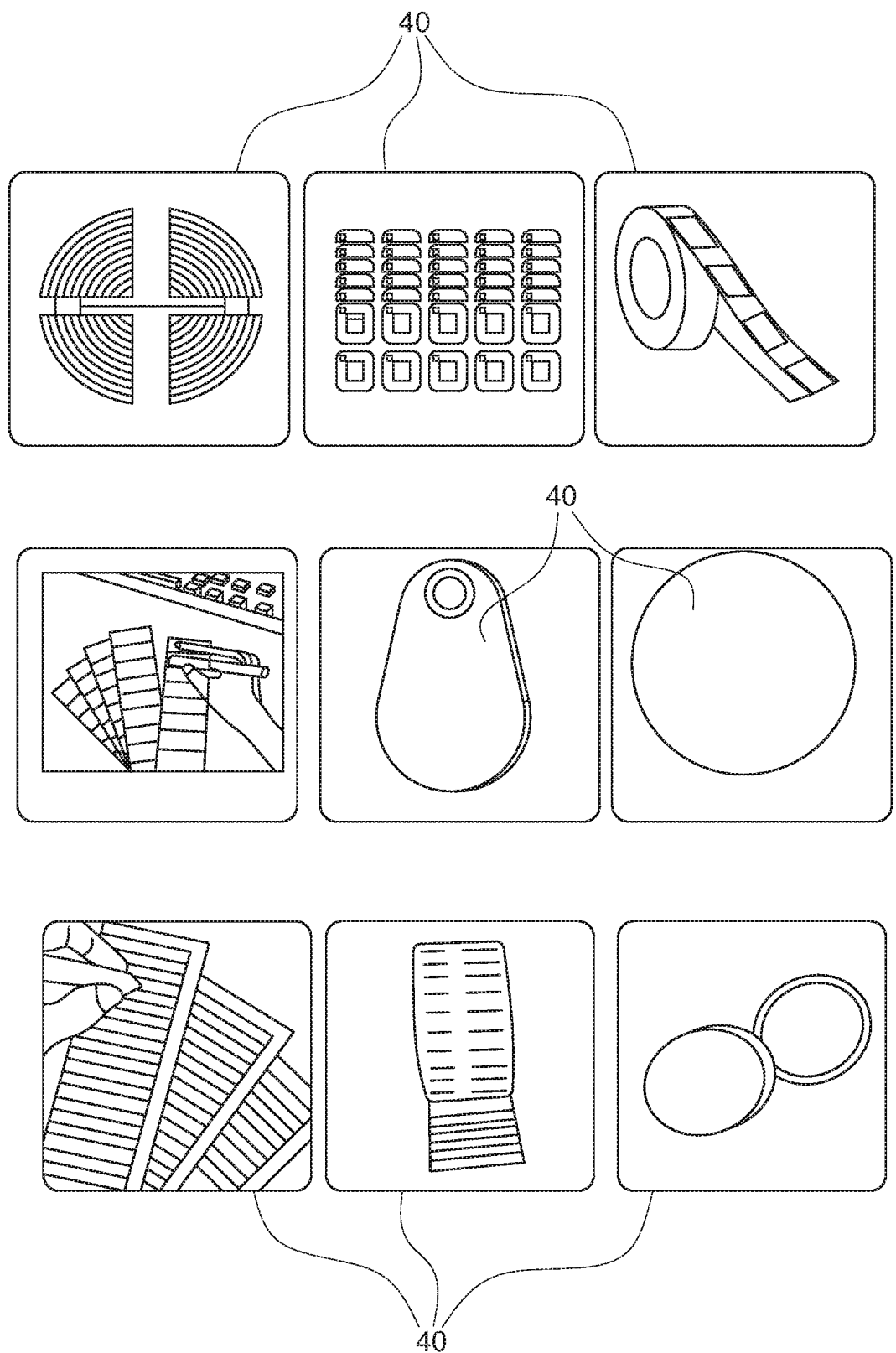
FIG. 4 depicts the shapes of various RFID tags that are currently available in the marketplace.

More specifically and with reference to FIG. 4, the present invention, in accordance with an aspect thereof, proceeds by irremovably affixing to the existing authorization card an RFID tag that is attached thereto adhesively and in a manner that any attempt to separate the RFID tag from the authorization card results in the destruction of the authorization card, or at least by leaving marks that reveal that the card has been tempered with or damaging the card. RFID tags are available in numerous shapes, varieties, sizes and functionalities. FIG. 4 depicts a number of different configurations of RFID tags 40 and shows that they can be circular or rectangular and can be provided in various forms, including in forms where they are provided only as a chip and antenna set that the ultimate user can affix to the particular product to which it is to be attached.

Figure 5:
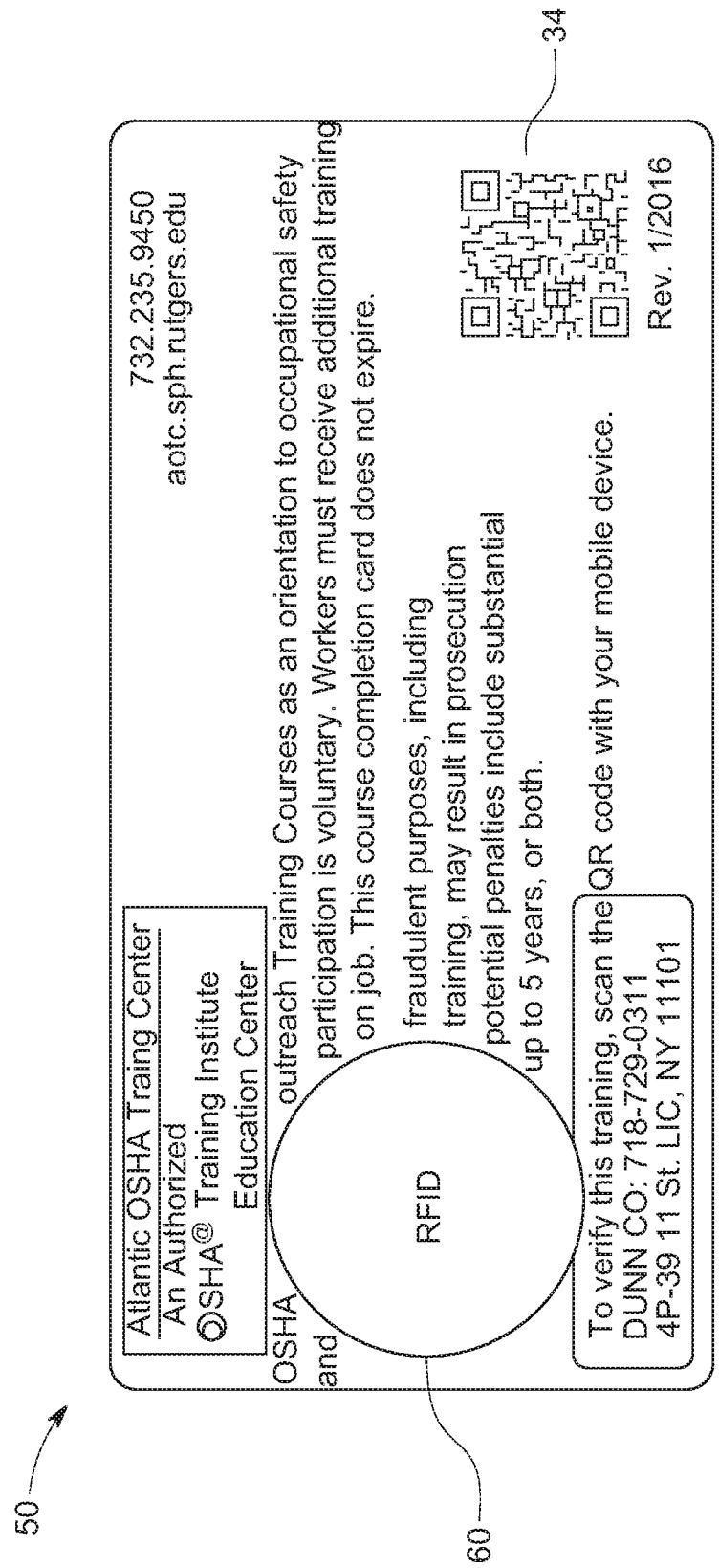
FIG. 5 shows the back of the OSHA card of FIG. 2 with an RFID tag adhesively and is irremovably attached to one side thereof.

Indeed, FIG. 5 shows an authorization card 50 in accordance with the present invention which has affixed to one side thereof an RFID tag 60. Radio Frequency Identification (RFID) is a wireless, non-contact use of radio frequency waves to transfer data. Tagging items with RFID tags allows users to automatically and uniquely identify and track various items, products and other assets. RFID technology allows text to be read without line of sight and, depending on the type of RFID, have a read range between a few centimeters to tens of feet.

There are three primary frequency ranges used for RFID transmissions—low frequency, high frequency and ultra-high frequency. Low frequency devices operate in a general frequency range of 30-300 kHz. The read range is from "contact" to about 10 cm, which is about 4 inches. The average costs are from 0.50 cents to several dollars per tag. However, these types of tags return to the reader a very limited amount of data/information.

The high frequency tags operate in the primary frequency range of 13.56 MHz and their read range is about a foot. The price per tag is similar to the low frequency devices. These devices can store and return more information, but they have a comparatively low data transmission rate.

The general frequency range of the ultra-high frequency tags is from 300-3,000 MHz with a primary frequency range from 433 MHz to 860-960 MHz. The ultra-high frequency tags can be obtained both as active RFID tags and as passive RFID tags. The active RFID tags can use and operate in a giga frequency range, have a much greater distance of reading but are comparatively more expensive. The passive RFID have a cost that varies widely from a few pennies to as high as $20.00.

An RFID tag, in its most simplistic form, has two parts—an antenna for transmitting and receiving signals and an RFID chip for storing the tag's ID and other information. Passive RFID tags do not have a battery and, instead, they receive energy from the radio waves generated by the reader, which activates the chip, which modulates the energy with the desired information and then transmits a signal back toward the antenna/reader.

The information that the RFID tag can return is widely varied among tags, some of which enable the end user to add their own information that is returned to the reader. The RFID come in various form formats including inlay, label, card, badge and hard tag and many are water resistant, rugged, temperature resistant and chemical resistant.

Figure 6:
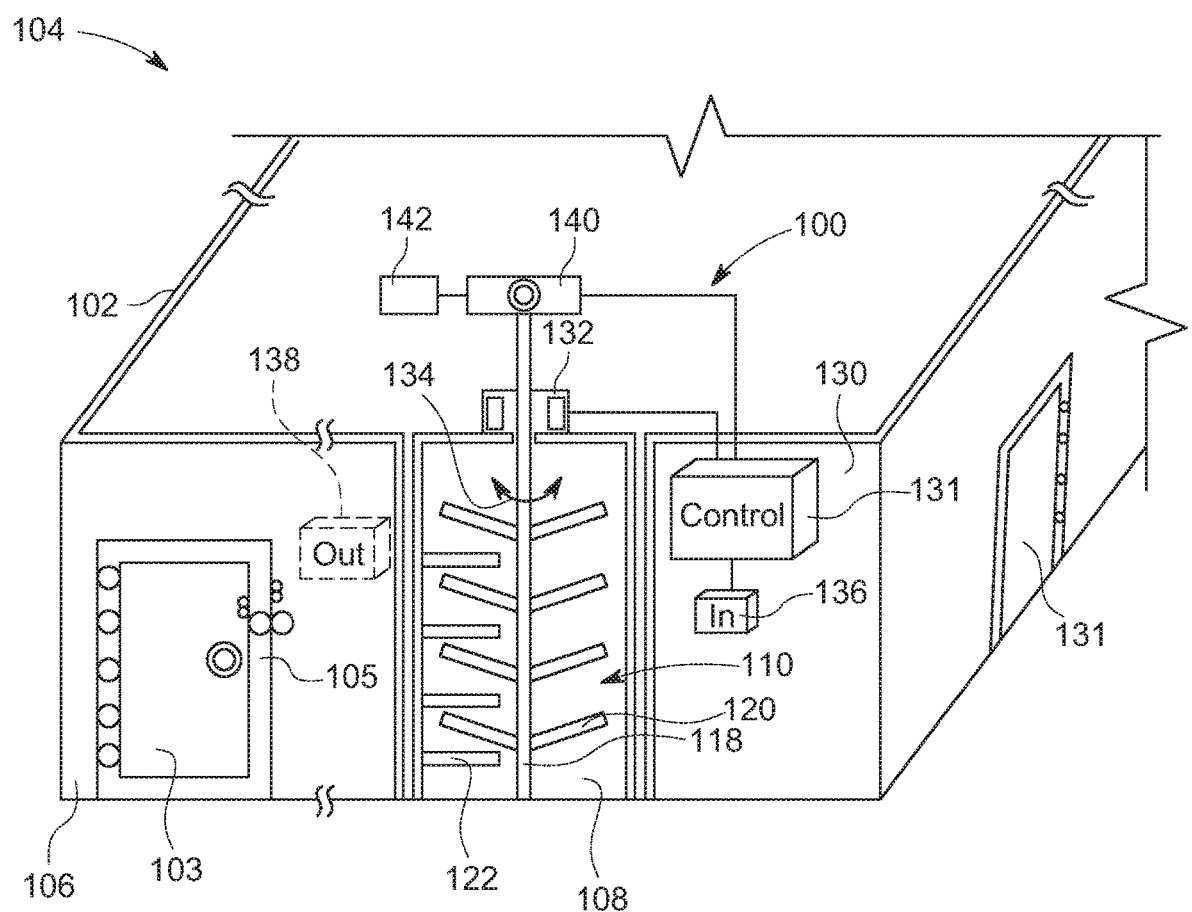
FIG. 6 is a general diagram of a construction site outfitted with various components and instrumentalities of the present invention.

In the typical construction site 100 depicted in FIG. 6, the construction site is partially or entirely surrounded by a circumscribing wall 102 that prevents access to the interior space 104 of the construction site and to which general access to personnel such as construction workers and the like is provided through a main entranceway 108 that is blocked by a turnstile 110. As widely known, the turnstile 110 has turning spokes 120 that can be turned by a main shaft 118 through a general turnstile control mechanism 130 that includes an electronics controller 131 that controls a mechanical motor or a ratcheting system 132 that enables the turnstile to turn either counterclockwise (for entry into the site) or counterclockwise (for egress from the construction site), as indicated by the arrow 134. The controller 131 is interfaced with an entry RFID reader 136 that is marked with the letters "IN" and an exit RFID tag reader 138 that is marked with the letters "OUT" (located inside the construction site) to thereby allow the turnstile to either turn in one direction to allow a person to enter or in the other direction to exit. The blocking bars 122 serve the same function as previously described.

The circumscribing wall 102 can support a large auxiliary door 103 that is normally chained by a chain 105 to allow entry of vehicles and the like (whose personnel are expected to first register through the turnstile 110). An emergency door 101 may also be provided to allow quick exit during emergencies, such as fires and the like.

The basic system may also include a camera 104 and/or a public announcing speaker 142 that also interface to the controller 131.

Figure 7:
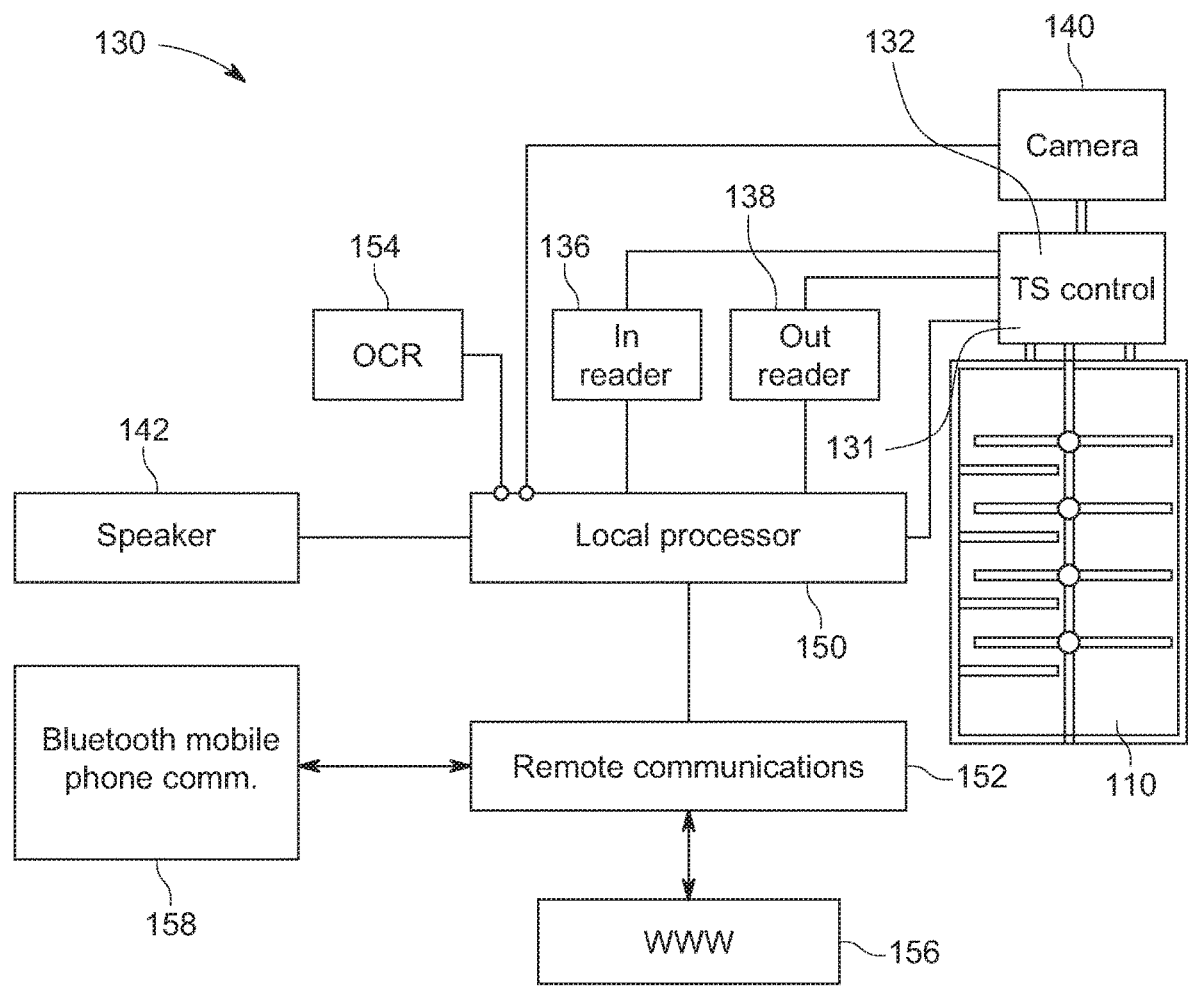
FIG. 7 is a block diagram of various electronic and mechanical components located at the construction site, in accordance with the present invention.

A system diagram for the electronic and mechanical controls at the work site is depicted in FIG. 7 which diametrically shows the turnstile 110 interfaced to the turnstile mechanical control 132 which is internally controlled by the controller 131 and interfaces with the camera 140 and speaker 142 through a local processor 150. The local processor 150 receives inputs from the IN reader 136 and from the OUT reader 138 and through various software processes and communications with other systems can either allow or deny access to a person seeking to enter the work site.

In a preferred embodiment, the local processor 150 is configured to remotely communicate, through remote communications hardware 152, with the worldwide web 156. This arrangement enables communication with a master server 162 (FIG. 8) that exercises control and provides various turnstiles to many different work sites. The motion sensor 162 is responsible for registering and overall management control over many different work sites.

In a preferred embodiment, the local processor 150 also communicates with an OCR 154 (Optical Character Reader) and is configured to physically read an OSHA card or a Department of Building card and communicate the "writing," e.g., identification number printed on that card to the central server 162 that is described below.

In addition, the local processor 150 may also communicate with a mobile device, e.g., a smart phone that communicates through Bluetooth and other well-known communication methods with the processor 150. Thereby, the mobile device 158 enables local communication with the local processor 150 by either workers or more importantly management personnel. For example, software in the local processor 150 may allow local managers to be alerted, e.g., via e-mail, message, etc. when a particular craftsman or contractor has arrived at the construction site. As another example, the local manager might be alerted that a particular entry request is being denied, and may then issue a command from the smart phone overriding the denial and enabling entry. Thereby, the software can alert a manger via email/SMS/or other means of communication about whatever event is important for the manager to be aware of. And in addition, the software can also receive input from a manager to override functions such as unlock the turnstile etc.

Figure 8:
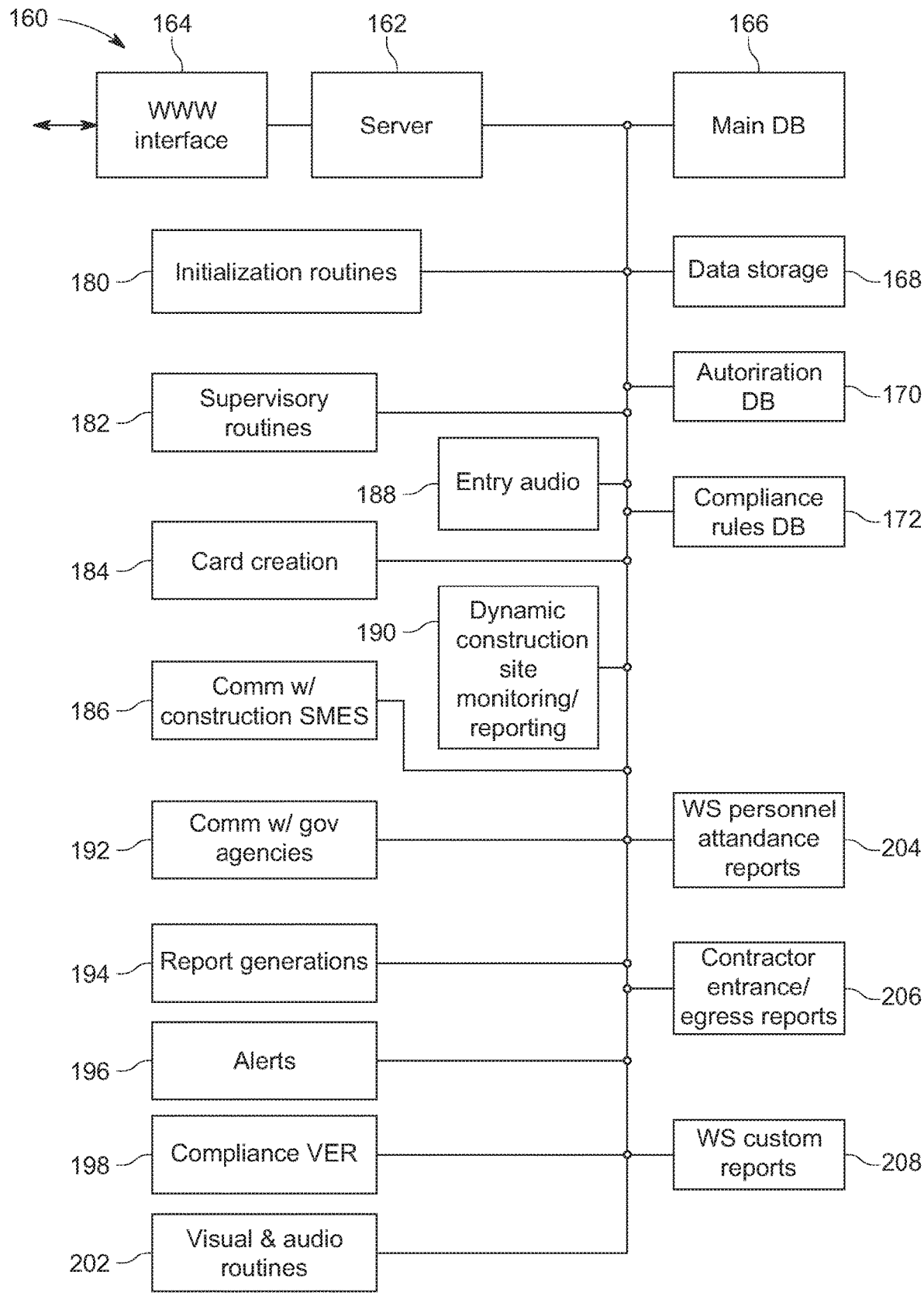
FIG. 8 is a block diagram of software and processing functionalities provided by a remote server associated with the present invention.

With reference to FIG. 8, an overall centralized control system 160 that may be located remotely to any of the construction sites or even be cloud-based, includes a processing server 162 that communicates through an interface 164 with management and the local processors 150 at the different work stations. The server 162 has a memory in which are stored programs and data for executing various software controlled tasks and to communicate with a main database 166 in which much of the information and software routines are stored. The system 160 may also include a data storage 168, an authorization database 170 (containing lists of RFID tags that have already been approved) and a compliance rules database 172 containing various (changing) rules of OSHA and other governmental agencies, so that the program can quickly adapt to new regulations and requirements. It is worth noting that the database 166 may include more than merely associations between work permits (or any documents) and assigned RFID tags. Thus, the database may store worker specific information such as the locations where the specific worker may enter, a list of all the work permits that the specific worker must carry (so that if a worker appears at a work site with only two of three needed work permits entry will be denied), the work day hours or dates on which the specific worker may be at different sites and so on.

From its functionality perspective, the system 160 may include an initialization module or routines 180 that initialize a system, generally as necessary for large and complex software constructs and also to handle, overall management and registration functions. The supervisory module 182 allows supervisors to examine the overall contents of the system 160 and determine and inspect, for example, how many employees and which employees are authorized for different work sites and these supervisory routines may be controlled by a single authority or on a sub-authority level where different owners of construction sites have access only to information that is pertinent to their specific work sites.

The entry authorization module 182 is responsible for interfacing with a work site and after receiving information of particular RFID tags having been detected, to respond with the instructions on whether the turnstile 110 may be activated to allow entry for the particular person seeking such entry.

In general, the card creation module 184 is responsible for the supervisory function of receiving information about specific individuals, the authorization cards that they carry and to issue to them specific RFID tags with specific information stored thereon that can be irremovably affixed to their government-issued authorization cards.

The module 190 enables dynamic interface with specific construction sites, for monitoring and reporting purposes that can be updated daily or even hourly to obtain a general picture of who is present at a particular site, when they have entered or have left and many functions that can go beyond the permitting of entry to a site, but which allow monitoring of personnel and allow management billing and cost information to be developed at constructions sites relative to contractors, jobs and tasks that are being performed, and the like.

The communication module 186 is responsible for handling specific communication requests between management personnel and the work sites.

In a further development of the invention, a special governmental communication module 192 is specifically designed to provide access only to governmental agencies, so that personnel at OSHA or at other governmental agencies can dynamically (in real time) monitor the comings and goings at specific work station sites, which may make it possible to dispense altogether with having to send live inspectors to specific sites and so greatly reduce the need to conduct visits to work sites.

The reporting module 194 enables management at specific construction sites or general management of the overall software construct to create specifically requested reports that are generated based on, for example, attendance records at specific sites over specific time periods and the like.

The alerts module 196 is responsible for reacting to specific situations that require alerts. For example, the individual construction sites might have been required by government agencies to not allow certain authorized personnel to enter a particular construction site and those personnel have nonetheless entered, creating an alert that is automatically generated both to the specific work site, to a government agency or as otherwise programmed or set by various operational controls. The compliance module 198 is programmed to be aware of various government compliance requirements and to generate new requirements that implement the changing regulations.

The visual and audio routine module 202 enables management personnel and others to create a direct link to the cameras 140 provided at the work sites, to observe the work site remotely. Thus, government personnel might from time to time simply watch the cameras and see whether cranes, elevators, and other types of equipment appear to have been properly erected and secured at various work sites.

The overall software construct 160 described in FIG. 8 may also have standard reports being generated, for example, a module 204 that generates work site personnel attendance reports, a module 206 that specifically identifies contractors entering and leaving the various sites, as well as custom reports that are specifically requested and generated for individual sites.

Based on the foregoing description, one of ordinary skill in the art would appreciate that the present invention has elevated construction site control from a rudimentary person identification system to a comprehensive system that not only assures that those who enter the site have all the required credentials with them, but also goes far beyond by creating a new control system for construction sites that tracks all the comings and goings and other activities at the restricted areas that construction sites represent.

The functionality provided by the system 160 of the present invention also enables delisting and deactivating various RFID tags when the system is informed that those RFID tags are to be disabled for a variety of reasons, as may be applicable.

The present invention also contemplates that eventually government agencies will cooperate with one another and will create the authorization paperwork that already have embed in them the RFID specific information which could become standardized in the industry.

One of ordinary skill in the art will realize that different construction site operators may have specifically requested needs that the system of the invention can accommodate which will include specific information on the RFID tags that they are requesting. For example, the system of the invention would allow reserving a few bits of data in the RFID tags that will contain specific construction site information.

Figure 9:
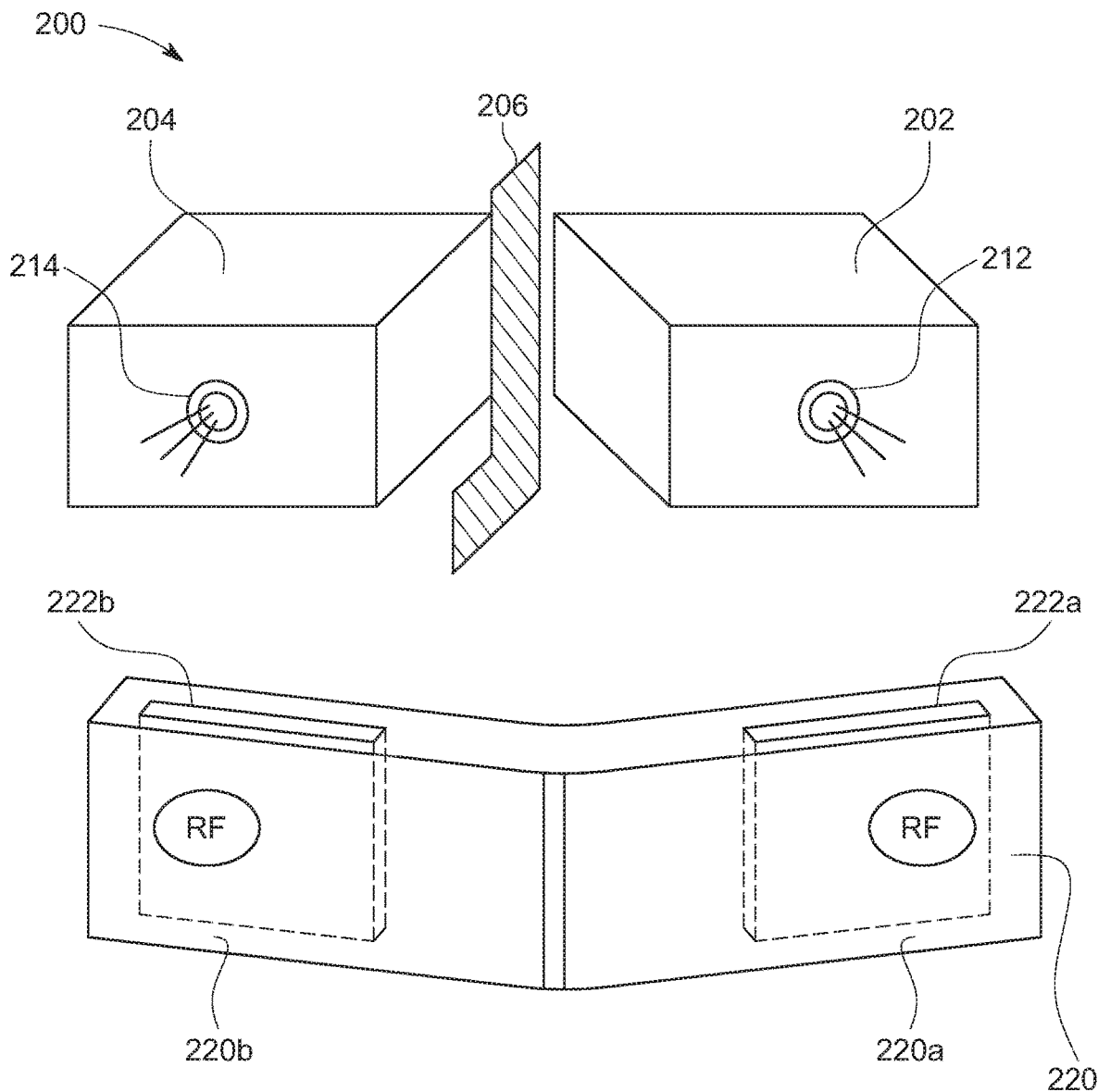
FIG. 9 shows a multi-reader arrangement that enables simultaneous reading of plural access cards.

A consideration construction sites involve the costs of installing the system of the present invention. RFID tag readers that can read one tag at a time are relatively inexpensive and may cost less than $20.00. On the other hand, card readers that can simultaneously read multiple tags require not only more expensive tags, but readers whose cost can approach $500.00. Yet, construction site workers may carry on them typically two authorization cards and it would be cumbersome and annoying to them to constantly present two different authorization cards. FIG. 9 provides a solution that may ameliorate the problem in some circumstances. In FIG. 9, the card reader consists of two inexpensive, single-tag readers 202 and 204 which are part of a system 200 that separates it to read it by an electromagnetic separator 206. Each reader has its own electrical energy emitter, for example, an emitter 212 and another emitter 214 which radiate in slightly different directions. With the above arrangement, a construction site worker who has a folding wallet 220 can locate one of the authorization cards 22*a* on one side and another authorization card 22*b* on another side and place them against the two readers so that the card on one side 22*a* and the card on the other side 22*b* are separately presented and read by the two inexpensive readers both of which are communicating with the local processor 150 who can easily simultaneously recognize that they are being carried by the same person based on internal records and so indicate in the system including the central system 160 that person carrying two licenses is entered.

Although in the description above the invention has been described relative to an entranceway blocking device and formal turnstile, the purpose of the invention can be implemented by gates that slide a door open and admit only one person at a time and many other constructions that would be readily apparent to one of ordinary skill in the art of controlling access to restricted areas.

Figure 10:
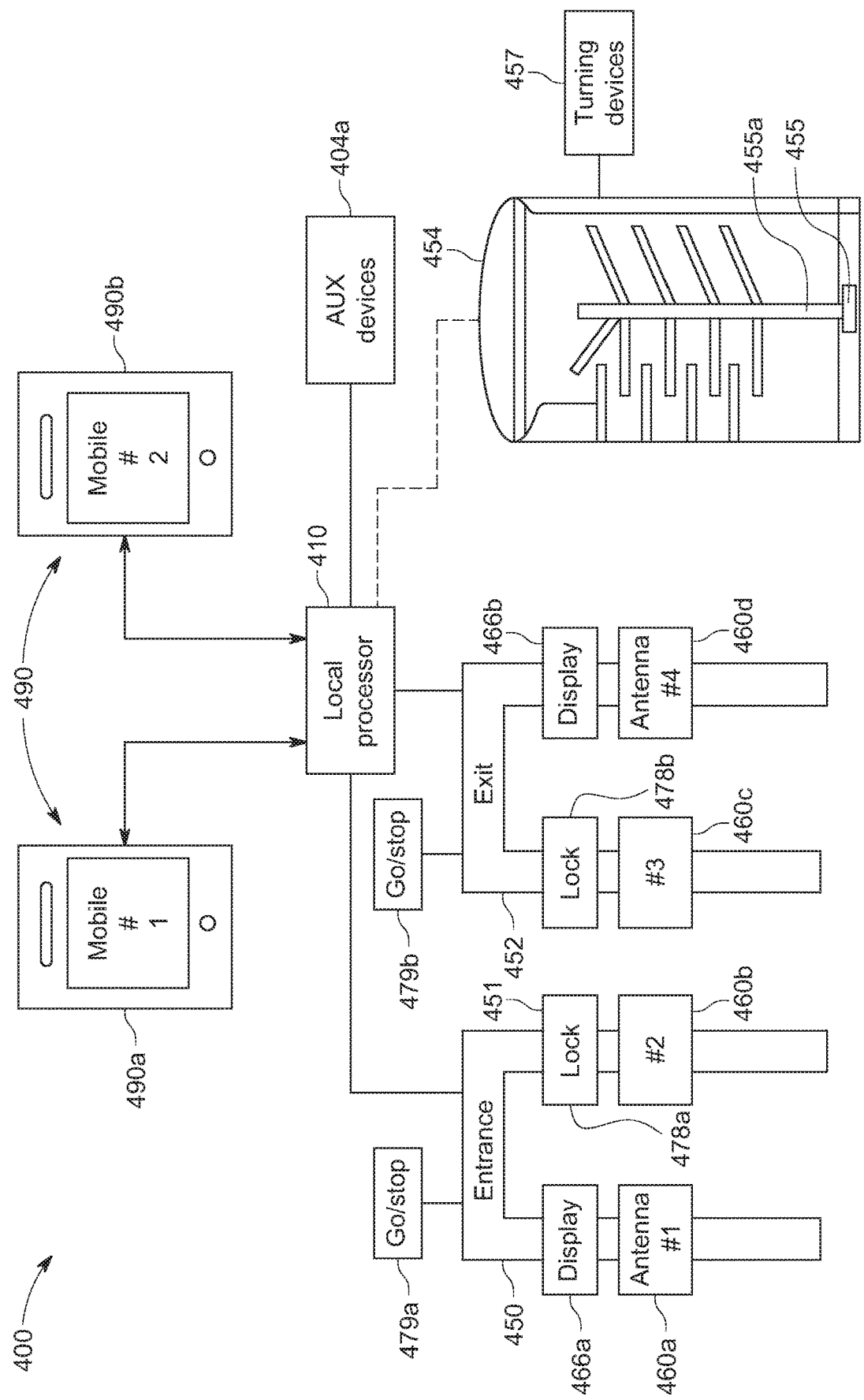
FIG. 10 is a block diagram for a local processor and system that is provided at work sites in accordance with another embodiment.
Figure 11:
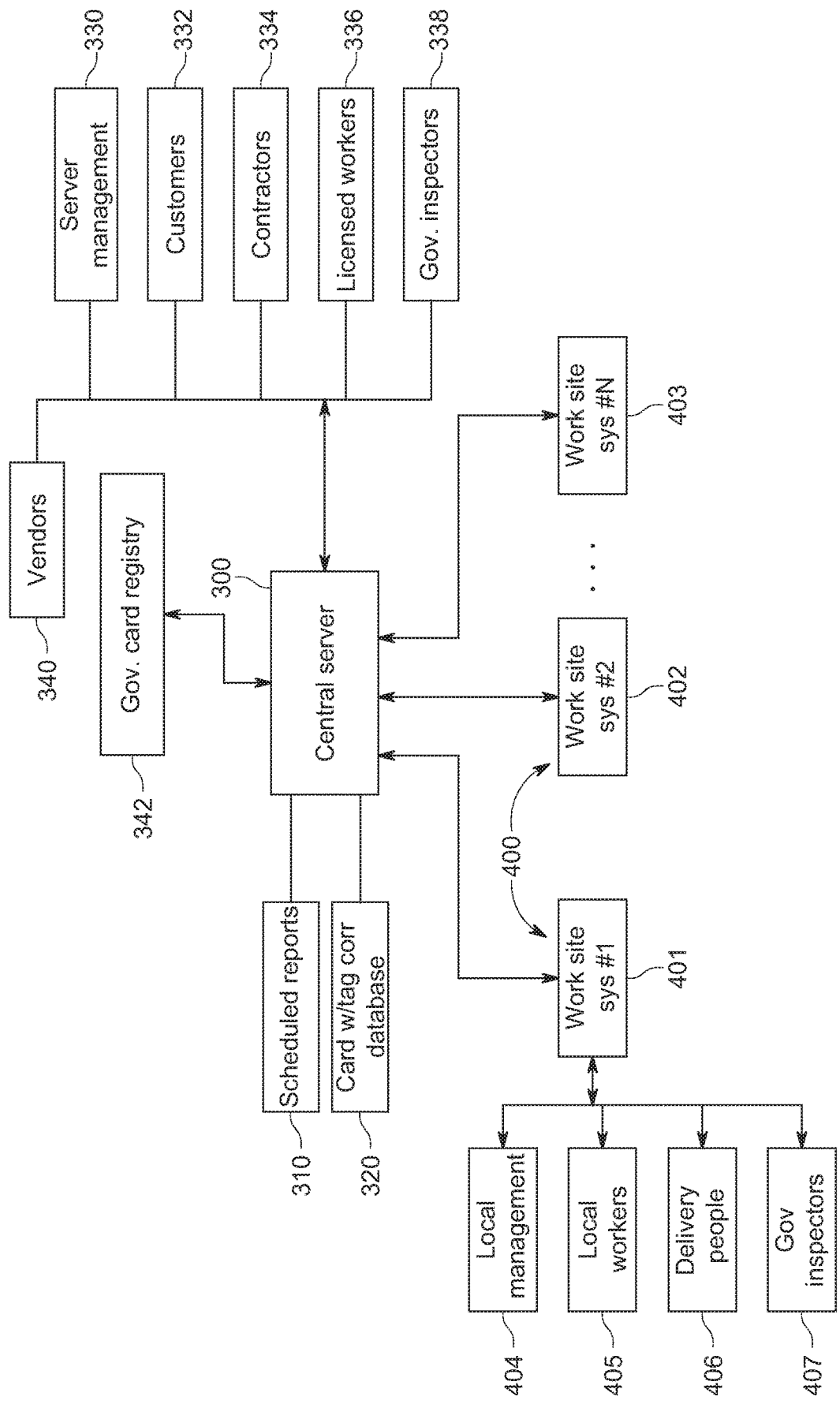
FIG. 11 is a block diagram of a web or central server style overall system block diagram for the embodiment shown in FIG. 10.
Figure 12:
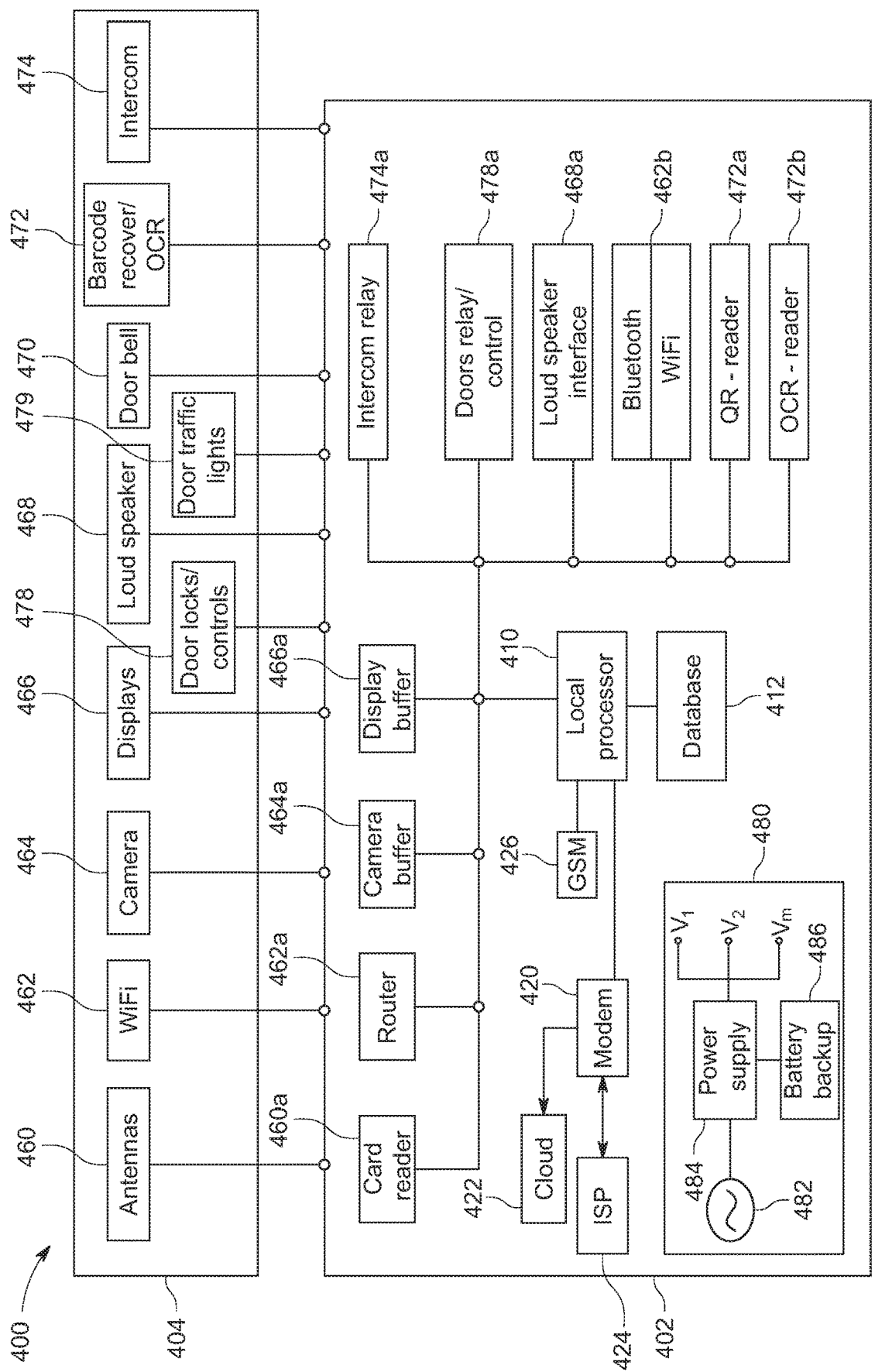
FIG. 12 is a further block diagram providing more detail on the work site local processor of FIG. 10.

Since the filing of the provisional patent application for the present invention, the inventors herein have evolved several implementations of the invention that have been substantially reduced to practice. With reference to FIGS. 10, 11 and 12, these more recently evolved embodiments comprise in the main local site systems that are controlled by or at least interact with a central server to realize the full potentiality thereof. Referring initially to FIG. 10, the figure shows in block diagram style the local site system 400, which is provided/installed at (and easily dismantled and moved to) various work sites that require or desire to have a system that controls the entrance and exit doors to the work site and most importantly that people who enter have valid authorizations to be present at the work site.

Essentially, the local system 400 comprises a local processor or a microcontroller 410 that interfaces with entry door 450 and an exit door 452, symbolically shown. At the entrance door 450 are provided a first antennas 460*a*, 460*b* that are designed to detect passive RFID tags that are irremovably (in a practical sense) affixed to work permits/authorizations issued by governmental authorities, such as OSHA and the like, as previously described. The system 400 enables the local processor to 410 to "read" those tags, verify that the tags are authentic (or authorized for the given site) and thereafter permit the person carrying the detected cards/tags to enter the work site, by operating a lock 478*a* at the entrance door 450 to admit one person, namely the authorized person. At the entrance door, a display 466*a* either provides information to the person entering such as a message "authorization granted" or "authorization denied" and the like. If necessary, the display can carry information directing the person seeking entry to take special action such as ringing a conventional door bell. Also, a large lit sign 479*a* that is controlled by the processor 410, which sign flashes green or red to indicate "go" or "stop" may also be provided, making it visible to others from afar whether the person at the door is authorized to enter.

In the same vein, a person seeking to exit the work site through the exit door 452 will have the tags attached to the authorization documents in his/her pocket sensed and read by the antennas 460*c* and 460*d*. This enables the local processor 410 to operate the lock 478*b* at the exit door and also provide the appropriate information at the display 466*b*, making other people aware of the person exiting the work site by operating the light 479*b*. If permitted, the exit door may be provided without any lock, and designed to sound very loud alarms upon anyone attempting to enter therethrough. Also, as previously described, the same overall functionality can be provided at a single entry/exit door, with the antennas being provided at opposed entry/exit locations thereof.

Also, the invention can be implemented with a turnstile door 454 that has a mechanical ratcheting system 455 that enables the turnstile column 455*a* to turn in one direction, to admit one worker to enter into the work site or, if actuated by the exit antennas, turn in the opposite direction to allow a single person/worker to leave the work site, all under the control of the local processor 410 that communicates with a door turning controller electronics 457. The ratcheting system 455 may be comprised of an electrical motor and a gear box (not shown) that can be operated to turn the turnstile door clockwise or counter-clockwise over an angle sufficient to allow a single work to pass through the door, upon sensing the person standing in the door space.

Similar to as has been previously described, the local processor 410 interfaces with many other physical devices, indicated generically as auxiliary devices 404.

The overall local-site system 400 can be controlled by one or more mobile devices 490 including a first mobile device 498, that may be associated with the local contractor/manager of the work site, which has been pre-loaded with one or more APPs that enable the device 498 to interface with the local processor 410 to effect various management controls, e.g., to add workers authorizations or to issue RFID tags to specific authorization documents carried by workers and many of the other functions previously described. The many other mobile devices indicated generically as mobile devices 490b may be associated either with other personnel including the workers themselves, contractors or vendors who may be granted more limited access to information stored in the memory or data bases associated with the local processor 410.

With reference to FIG. 11, on a global basis, the central server 300 is configured to supervise work site systems 400 located over large geographical regions that span one or more States or an entire country, each work site system being indicated as work site 401, 402 . . . 403 and so on. The central server 300 is configured to be programmed/controlled the server's management modules/APPs 330 to control the manner and mode of communications with "clients" of the overall system including work site customers 332 (each of which is associated with one of the work sites (401, 402, 403), and possibly contractors 334 that have worker personnel and equipment at several of the work sites, at different geographical locations. Other entities or organizations that communicate with the central server 300 may include licensed workers 336, governmental inspectors 338 as well as vendors 340 that have an interest of providing information or advertising to the customers/contractors 332 about services and materials that they provide such as steel/iron/wood products, machinery, elevator systems and the like. The central server 300 has the internal software that been preprogrammed to provide scheduled reports 310 to organizations/entities such as to the customers, the contractors, the government inspectors which can be provided in response to specific requests therefor or on a scheduled basis through cloud or web-based systems, e.g., emails, database or the like in well-known manner.

One of the most important subsystems of the central server 300 is the database 320 which contains/stores the correlations between card holder authorization cards (each identified with its own serial number and issuing authority) and the RFID tag identification code of tag 40 that has been assigned and irremovably affixed to the worker's authorization card 30, as previously described. As further indicated in this figure, each work site 401, 402 . . . 403 allows local communication with entities such as local managers 408, local workers 405, delivery personnel 406 and governmental inspectors 407.

As shown in FIG. 12, a typical work site 400 may include and be outfitted with various subsystems, although different work sites may opt to be fitted with less than all of the subsystems described below. In FIG. 12, overall control of the work site system 400 is provided by the local processor 410 which may consist of a PCB processor card or a microcontroller 410 that may interface with a GSM 426 that provides information about the current location of the local processor 410, which location is transmitted to the central server 300. In addition, although a master correlation database 320 is available at the central server 300, a local database 412 that provides the cards-to-tags correlations for the workers at the local site is also preferably provided to assure that local sites 400 remain operational even when there are interruptions in the communications with the central server 300.

In the normal course, communications by the local processors 410 to the outside world are effected through the modem 420 that communicates either with a web-based application, a cloud based application 422 or via an assigned ISP 424 and the like. Electrical power to the work site system 400 is provided by a power system 480 that receives AC power 482 and provides it to a power supply 484 that produces DC and AC voltages needed to operate the various sub-systems previously described or further described below. These power outputs include voltages V1, V2, Vn that comprise, for example, a 5 volt DC output to power local electronic circuits, a higher DC voltage to operate some of the displays, and an AC electrical output to power a motor or the like, all as needed. The battery backup 486 assures that uninterrupted power is being delivered, even when electrical power at the work site is interrupted for any reason (which is not unusual at construction work sites).

Locally, the work site system 400 can be deemed to mainly consist of the electrical/electronic section 402 and the collection of physical devices 404 that are physically separate from and located at a distance from the electronics 402. The electronics section 402 may be housed in a separate box that can be installed preferably near the doors, the box 402 being suitable to be easily moved from and to any other work site. The physical devices subsystem 404 may include the aforementioned antennas 460, a Wi-Fi communication facility 462, one or more cameras 464, various displays 466, door locks and controls 478, a loudspeaker system 468, door traffic lights 479 that indicate in large neon style letters whether personnel are/is entering, exiting or denied entry to the work site, a doorbell 478 that can be heard throughout the work site to indicate that a person is present at the door and is unable to enter, a barcode reader or OCR (optical character reader) 472 and an intercom 474.

The aforementioned antennas 460 interface with and controlled by a card sensor/reader software/hardware module 460a that communicates the antennas either by hard wire or wirelessly. The router 462a may be configured to communicate with a modem and provide local Wi-Fi communications or Bluetooth communication through a subsystem 462b. The camera buffer 464a receives images captured by the cameras 464 and provides the captured image data to the local processor 410 for storage, so that as each person is entering, a photo of that person is also taken and capable of being sent to the central server 300 to provide a history of persons entering/exiting the work site (which history can be maintained permanently or just for a forty-eight hour period and the like). The display buffer 466a is used to refresh and provide information that is displayed by the displays 466 at the local doors, as previously provided. The intercom relay 474a subsystem controls the intercom 474 and can energize it to create a direct local connection through an intercom system that is located at the work site management trailer and the like (not shown), to allow management to speak to vendors or workers that arrive and do not have the right credentials or have not been preapproved to enter the given work site. The doors relay and control subsystem 478a interfaces with the door locks and controls 478 and provide the necessary control signals thereto. The loudspeaker interface 468a interfaces with the loudspeaker 468 and allows announcements to be made that are heard throughout the work site so that delivery people, for example, cement trucks and steel delivering trucks can be provided with instructions as to where to park and how to gain access to the work site.

In the event that a worker or a subcontractor with the right licensing authorization papers arrives, which have not yet been registered for the given work site and/or not yet been processed to have an RF tag 40 attached thereto, the local work site managers can utilize the locally provided QR Reader/OCR (optical character recognition) devices 472a/472b that read and store the raw data, and then allowed to enter based thereon. Tags 40 can be issued and/or processed for the presented authorization cards inside the work site, reducing delay and making for an overall experience that is more user-friendly. The raw information is provided to the central server 300 for records keeping and control purposes. This process may be controlled in part remotely via the mobile devices 490.

In embodiments that have been reduced to practice in accordance with the description of FIGS. 10-12, the local processor has been implemented with an MCU-PRO device that is known in the field as a robot DYN MCU-MCUPRO (86 IO) device. As readers that communicate with the antennas 460 have used a device known as the Spark Fun UHF RFID reader (Nano) provided from the SparkFun Company. For a modem, the Janicellular Modem LTE 910xf from the Janus Company has been used.

Thereby, it has been possible to use a single device that controls both an entrance door and an exit door with a single controller. As a display, an embodiment of the invention uses a seven inch display that is known as the Raspberry PI display available on the market. As RF tags, the invention has been implemented with tags made available by Tagmatiks that come as peel-able tags that are QR coded, show alphabetically the assigned code, and provided with "HUF wet inlay" construction. These tags operate at a frequency of 860-960 MHz, about 43 mm×90 mm in size and have a permanent adhesive glue on their rear surface, so when the tag is attached to an authorization document, they cannot be removed therefrom without damaging it. These tags come on a roll and would be provided to the work site management personnel for being affixed to the government-issued authorization cards 30. Each of these RFID tags is unique and the possibility of two tags being confused borders on the impossible. Therefore, it would never happen that the same RFID code would be applied to different authorization papers.

As noted above, the GPS component 426 which is connected to the local processor would provide to the central server 300 the work site location, and thereby entry would be permitted only to the authorized work site locations.

As described above, the local work site system keeps the local database 412 synchronized with a server site database 320, so it can attend authorization tasks locally, enabling it to work offline when the Internet connection is unavailable. The server-side application/software is built to register many different companies and sites and assign roles to give and restrict user access to specific sites at specific times, etc. In general, it is contemplated that only the server manager 320 has the authorization to register work site companies, while the local sites are tasked with granting entry rights and assigning and attaching RFID tags to individuals' work papers and craftsmen documents. The server management personnel 320 is preferably exclusively in control as to which of the customers, contractors, vendors and the like shall have access to the information gathered by the system, portions of which is quite personal and not appropriate for anyone to see and use.

According to the general preferred process of the invention, the local work site manager devices, e.g., mobile devices or desk top computers are programmed to process authorization cards, to grant entry privileges to specific work sites and some of the other functions described above by the methods described below. Firstly, the local manager creates an employee profile, e.g., John Smith, Plumber, personal data and the like. Secondly, the manager collects the authorization cards that the worksite craftsman must carry at all times at the worksite, for example, an OSHA card, a plumber license, a welding license and the like and enters their data to the local system. This can be done manually, or in more advanced systems by OCR-ing the card or by having it read with a bar code reader (usually the QR code). This step would prevent entry errors. Thirdly, the manager removes from the RFID tag stock at the worksite management office several RFID tags, one for each authorization card. The selected tags are registered in the local processor 410 against the authorization cards just entered. Simultaneously, if possible, the local processer 410 communicates this information to the server 300 that carries out authenticity checks. That assures that the same card has not already been previously registered or that the card is inauthentic (by comparing to governmental records). Once the local manager has obtained the assurance that the card being process is authentic the transaction is approved in the software and the physical RFID tag that has been assigned is affixed to the physical card.

With the local and central systems of the present invention, worker need not physically produce at a gate or entry door any credentials. The authorization card or even multiple cards will be automatically sensed, read and stored in the system as being located at the given work site. If a worker presents herself with only a single card and the system is aware that this individual requires a second card, e.g., a welder's license, this will be flagged to the worker and/or to the local management. The possibility of employees or worker "sneaking in" without having on their bodies the needed papers is rendered close to impossible protecting the worksite operator from fines, injury to personnel and general protection to the public at large.

Some work sites cannot be sealed off with walls and gates to prevent anyone from finding a way in, including through a doorway temporarily or accidentally left often. This this end, the present invention contemplates mounting one or more of the local systems 400 inside the work space, e.g., near toilet facilities and the like, and include a facility that senses the approaching person and then testing/checking that the person is carrying the required authorization papers, and sounding a general alarm and directing the person to immediately report to the manager on site.

The invention has been described above in relation to governmental work permits and the task of assuring that workers at construction work sites carry the needed permits whenever they enter a work site. But the conceptual underpinnings of the instant inventions are broader then that application. Thus, the present invention enables a large contractor with multiple work sites and workers that constantly move between work sites to issue its "worker papers" bearing the RFID tags and to obtain continues data where their workers are during their work hours and to generate billing and invoicing to various entities and customers and/or pay subcontractors based on the amount of time spent by different workers and craftsmen at different work sites. This same functionality is also optionally provided by the central server 300 to either contractors or vendors or anyone who prearranges with the operators of the central server to receive such reports.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A credentials verification system for controlling compliance with required carrying of permit cards at construction work sites, the system comprising:
  an association database with stored data that correlates a plurality of work permits with RFID data corresponding to a plurality of RFID tags, wherein a respective and unique RFID tag is assigned to each work permit;

a collection of physical work permits carried by a plurality of workers, each work permit having been issued to a single worker and being configured to be carried by the single worker to work sites, each said work permit having physically adhered thereto said respective RFID tag in a substantially irremovable manner;

a local control system configured to be installed at a work site, the local system including:

a) an RFID tag reader configured to read an RFID tag wirelessly, when a worker carrying the work permit approaches within a predetermined distance of said RFID tag reader;

b) a local processor and a software facility associated with the local processor, the software facility being configured to verify that a sensed RFID tag is authorized by comparing the RFID data of said RFID tag against corresponding data of said work permits stored in said association database; and c) an entry controller operating under the local processor for controlling an entranceway into said work site so as to admit a worker only when said worker has been determined to carry a duly authorized, required work permit.

2. The credentials verification system of claim 1, wherein the RFID tag reader is configured to read more than one RFID tag carried by the single worker and to associate each sensed RFID tag with corresponding multiple work permits.

3. The credentials verification system of claim 1, wherein the entranceway comprises one or more locked doors and including controlling a lock associated with each door to allow entry of a worker whose RFID tag associated with a corresponding work permit has been verified.

4. The credentials verification system of claim 1, wherein the system further comprises a central server in communication with a plurality of said local control systems and wherein said association database is located at and controlled by said central server.

5. The credentials verification system of claim 4, wherein the association database includes a related local association databases that contains sufficient data to allow verification of the credentials of workers who are assigned to the local work site.

6. The credentials verification system of claim 1, wherein the local processor comprises a local microcontroller to perform and execute software instructions associated with functions executed by the local control system.

7. The credentials verification system of claim 1, wherein the local processor comprises a local PCB (printed circuit board) general purpose and programmable computer to perform and execute software instructions associated with functions executed by the local control system.

8. The credentials verification system of claim 1, wherein the entranceway comprises an entrance door and a separate exit door and wherein and an antenna for the entrance door is located on the outside of the work site and another antenna for an exit door is located inside the work site.

9. The credentials verification system of claim 1, wherein work sites keep available unassigned RFID tags that management personnel at a work site are able to irremovably attach to a work permit presented by a person seeking to enter work site and to cause an association record to be added to said association database upon such event.

10. The credentials verification system of claim 1, wherein the entrance door comprises a turnstile door.

11. The credentials verification system of claim 10, wherein the turnstile door is configured to rotate bi-directionally and wherein the local control system is configured to enable rotation if a first direction to admit a worker into the work site or in an opposite direction when a worker is sensed approaching an exit side of the turnstile.

12. The credentials verification system of claim 1, wherein the local control system further comprises and is configured to control one or more auxiliary devices, an auxiliary device being one or another of a camera, a display, a loud speaker, a doorbell, a barcode reader, an OCR device and an intercom, to, respectively, photograph and store images, display instructions/information to workers and visitors, enable voice messages to be heard throughout the work site, alert management that a person at the entranceway requires assistance, read barcode or QR codes printed on a work permit, and to establish an intercom connection between the entranceway and a management office at the work site.

13. The credentials verification system of claim 1, wherein said RFID tag reader is coupled to antennas that excite a signal in the RFID tags and receive a response signal from the RFID tags that is unique to each RFID tag.

14. The credentials verification system of claim 1, wherein the local control system also comprises one or more of a router and a modem that enables internet communication with a remote central server and/or local WI-FI communication with local mobile controllers for the local control system.

15. The credentials verification system of claim 4, wherein the local control system comprises a GSM device that provides geographical location coordinates of the local processor and the local processor is configured to send the geographical coordinates to a central server.

16. The credentials verification system of claim 4, wherein the central server is configured to be accessible by server management devices and by one or more of customers/contractors who operate the work sites, contractors that provide services at work sites, licensed workers, governmental inspectors and vendors of products and services to said customers/contractors.

17. The credentials verification system of claim 1, wherein said RFID tags operate in an 860 to 960 MHz range and wherein RFID tag reader said is configured to read multiple RFID tag associated with plural work permits carried by a worker seeking entry to work site.

18. The credentials verification system of claim 1, including a facility that denies entry to a specific worker who is determined to carry less than the full complement of work permits expected to be carried by the specific worker.

* * * * *